(12) United States Patent
Buryak et al.

(10) Patent No.: US 9,441,062 B2
(45) Date of Patent: Sep. 13, 2016

(54) MULTIMODAL POLYETHYLENE POLYMERS AND METHODS OF MAKING AND USING THE SAME

(71) Applicants: BOREALIS AG, Vienna (AT); ABU DHABI POLYMERS COMPANY LIMITED (BOROUGE) L.L.C., Abu Dhabi (AE)

(72) Inventors: Andrey Buryak, Linz (AT); Christian Rein, Marchtrenk (AT); Luc Monnissen, Arsimont (BE); Geir Kristian Johnsen, Abu Dhabi (AE); Joy Cheng, Linz (AT)

(73) Assignees: Abu Dhabi Polymers Company Limited (Borouge), LLC, Abu Dhabi (AE); Borealis AG, Vienna (AT)

( * ) Notice: Subject to any disclaimer, the term of this patent is extended or adjusted under 35 U.S.C. 154(b) by 0 days.

(21) Appl. No.: 14/888,984

(22) PCT Filed: May 9, 2014

(86) PCT No.: PCT/EP2014/059579
§ 371 (c)(1),
(2) Date: Nov. 4, 2015

(87) PCT Pub. No.: WO2014/180989
PCT Pub. Date: Nov. 13, 2014

(65) Prior Publication Data
US 2016/0083488 A1    Mar. 24, 2016

(30) Foreign Application Priority Data
May 9, 2013   (EP) .................................. 13167191

(51) Int. Cl.
| | | |
|---|---|---|
| *C08F 210/16* | (2006.01) | |
| *C08L 23/06* | (2006.01) | |
| *C08F 210/02* | (2006.01) | |
| *C08L 23/08* | (2006.01) | |
| *B65D 41/00* | (2006.01) | |

(52) U.S. Cl.
CPC ............. *C08F 210/02* (2013.01); *C08L 23/06* (2013.01); *C08L 23/0815* (2013.01); *B65D 41/00* (2013.01); *C08L 2205/025* (2013.01); *C08L 2308/00* (2013.01)

(58) Field of Classification Search
CPC ............. C08F 210/16; C08F 2500/05; C08F 2500/07; C08F 2500/12; C08F 2800/10; C08L 23/16; C08L 2205/02; C08L 2207/062; B65D 41/00
See application file for complete search history.

(56) References Cited

U.S. PATENT DOCUMENTS

| | | | | |
|---|---|---|---|---|
| 7,737,220 B2 * | 6/2010 | Swabey | .................. | C08L 23/06 525/192 |
| 7,829,646 B2 * | 11/2010 | DesLauriers | ........... | C08F 10/00 428/36.9 |
| 8,129,472 B2 * | 3/2012 | Turner | .................... | G08L 23/04 525/191 |
| 8,580,895 B2 * | 11/2013 | Standaert | .............. | C08F 210/16 525/240 |
| 8,962,755 B2 * | 2/2015 | Wang | ...................... | C08L 23/08 264/328.1 |
| 9,074,082 B2 * | 7/2015 | Wang | .................. | C08L 23/0815 |
| 2008/0033111 A1 | 2/2008 | Polosa | | |
| 2013/0018154 A1 * | 1/2013 | Buryak | .................. | C08L 23/04 525/240 |

FOREIGN PATENT DOCUMENTS

| | | |
|---|---|---|
| EP | 0517868 | 12/1992 |
| EP | 0688794 | 12/1995 |
| EP | 0810235 | 12/1997 |
| EP | 1655336 | 5/2006 |
| EP | 1655338 | 5/2006 |
| EP | 1753791 | 2/2007 |
| EP | 1940942 | 7/2008 |
| EP | 2360192 | 8/2011 |
| WO | 9618662 | 6/1996 |
| WO | 9744371 | 11/1997 |
| WO | 0114122 | 3/2001 |
| WO | 2004055068 | 7/2004 |
| WO | 2004055069 | 7/2004 |
| WO | 2008137722 | 11/2008 |
| WO | 2013/040676 | † 3/2013 |

OTHER PUBLICATIONS

International Search Report and Written Opinion for PCT/EP2014/059579 mailed Jul. 17, 2014.

* cited by examiner
† cited by third party

*Primary Examiner* — Rip A Lee
(74) *Attorney, Agent, or Firm* — Gardner Groff Greenwald & Villanueva, PC (57) ABSTRACT

A multimodal polyethylene polymer having an $MFR_2$ of 0.05 to 10.0 g/10 min, a density of 940 $kg/m^3$ or more, a tensile modulus of 900 MPa or more wherein Formula (I).

22 Claims, 4 Drawing Sheets

Figure 5 FNCT and tensile modulus

MULTIMODAL POLYETHYLENE POLYMERS AND METHODS OF MAKING AND USING THE SAME

The present invention relates to a polyethylene polymer for injection moulded articles, in particular for the manufacture of caps and closures. The present invention also relates to a process for the production of said polymer, an injection moulded article comprising said polymer and to the use of said polymer for the production of an injection moulded article such as a cap or closure. The polyethylene of the invention is a multimodal high density polyethylene with a particular molecular weight distribution enabling the formation of injection moulded articles with advantageous properties in terms of stress crack resistance and tensile modulus and in terms of article aspect (appearance).

BACKGROUND

Injection moulding may be used to make a wide variety of articles including articles having relatively complex shapes and a range of sizes. Injection moulding is, for instance, suited to the manufacture of articles used as caps and closures for food and drink applications, such as for bottles containing carbonated or non-carbonated drinks, or for non-food applications like containers for cosmetics and pharmaceuticals.

Injection moulding is a moulding process in which a polymer is melted and then filled into a mould by injection. During initial injection, high pressure is used and the polymer melt is compressed. Thus, upon injection into the mould the polymer melt initially expands or "relaxes" to fill the mould. The mould, however, is at a lower temperature than the polymer melt, and therefore as the polymer melt cools, shrinkage tends to occur. To compensate for this effect, back pressure is applied. Thereafter the polymer melt is cooled further to enable the moulded article to be removed from the mould without causing deformation.

An important property of an injection moulded article is its stress crack resistance. It will be appreciated that the injection moulded articles of the invention should not exhibit brittle failure and should therefore possess a high stress crack resistance. An increase in stress cracking resistance is however, generally associated with decreases in tensile strength, e.g. in tensile modulus. It will also be appreciated that injection moulded articles are preferably stiff. This decrease in tensile modulus is particularly marked for HDPE. The present inventors sought new HDPEs, developed in particular for the cap and closure market, which posses improved stress cracking resistance and high tensile modulus. To add to the challenge however, these improvements must not be at the expense of processability of the polymer or the appearance of any article formed. Processability must be maintained or even improved to meet customer needs. Injection moulded articles are produced rapidly and any reduction in processability can increase cycle times and hence reduce process efficiency.

The present inventors have found that if HDPEs possess a certain relationship of molecular weight properties at melt flow rates appropriate for injection moulding, high stress crack resistance and tensile strength can be achieved. In particular, the present invention describes a multimodal HDPE polymer with tailored molecular weight that results in improved FNCT without reduction in tensile modulus. Our FNCT is clearly improved over a selection of comparable commercial polymer grades. In addition, caps or closures produced using this polymer have better aspect, specifically in terms of lower high-tips and less angel-hair.

When a cap or closure is formed in the injection moulding process, there is normally a small defect at the point of injection on top of the cap. This defect is a slightly raised portion on the top of the cap and is called a high tip. Whilst it is difficult to observe with the naked eye, the high tip can usually be felt on the top of most caps and closures. The polymers of the present invention allow this high tip to be minimised in size.

Figure 1:
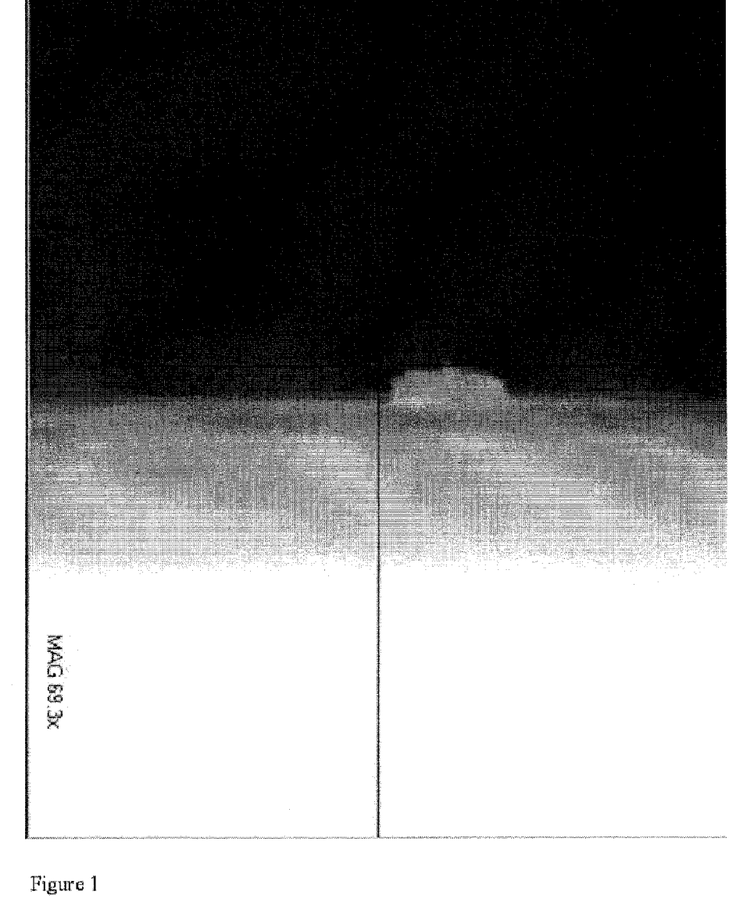
FIG. 1 shows a cap with an acceptable small tip.
Figure 2:
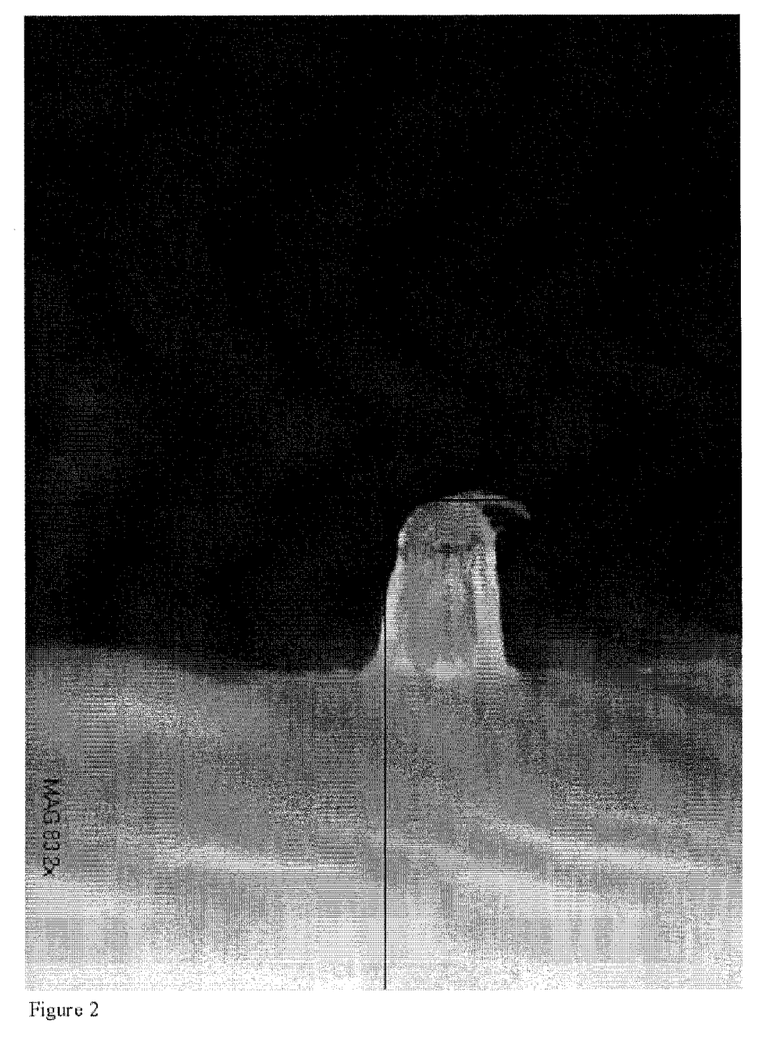
FIG. 2 shows a cap with "high tip".

We attach hereto as FIGS. 1 and 2, pictures of a high tip (FIG. 2) which is generally unacceptably extended, and a low "high tip" (typically one that is less than 0.5 mm in height—FIG. 1) which is the target in the industry.

Figure 3:
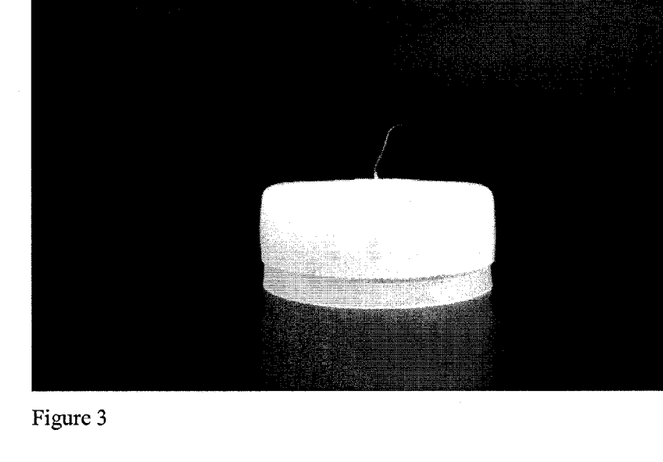
FIG. 3 shows the presence of angel hair on a cap.
Figure 4:
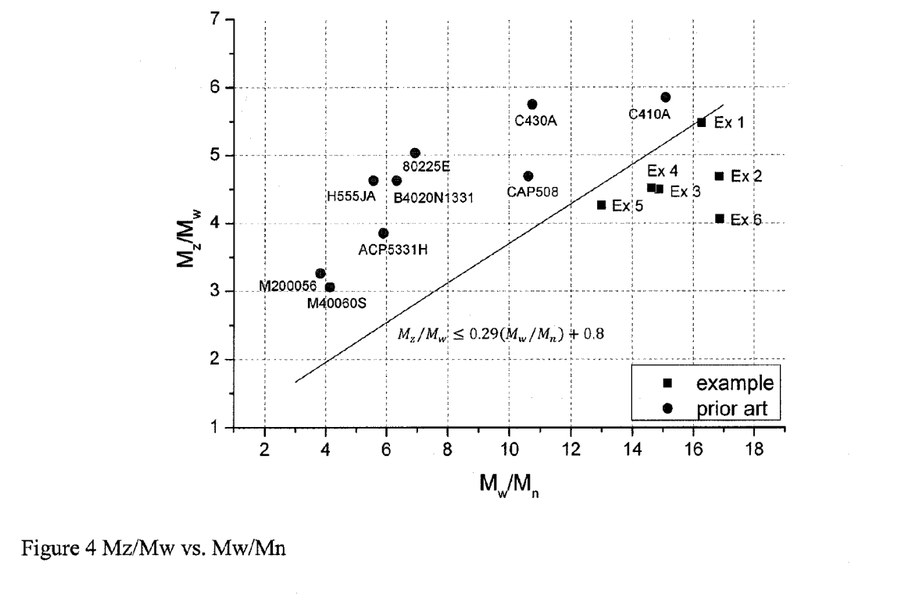
FIG. 4 shows the relationship between Mz/Mw and Mw/Mn plotting the line of the equation of the invention.
Figure 5:
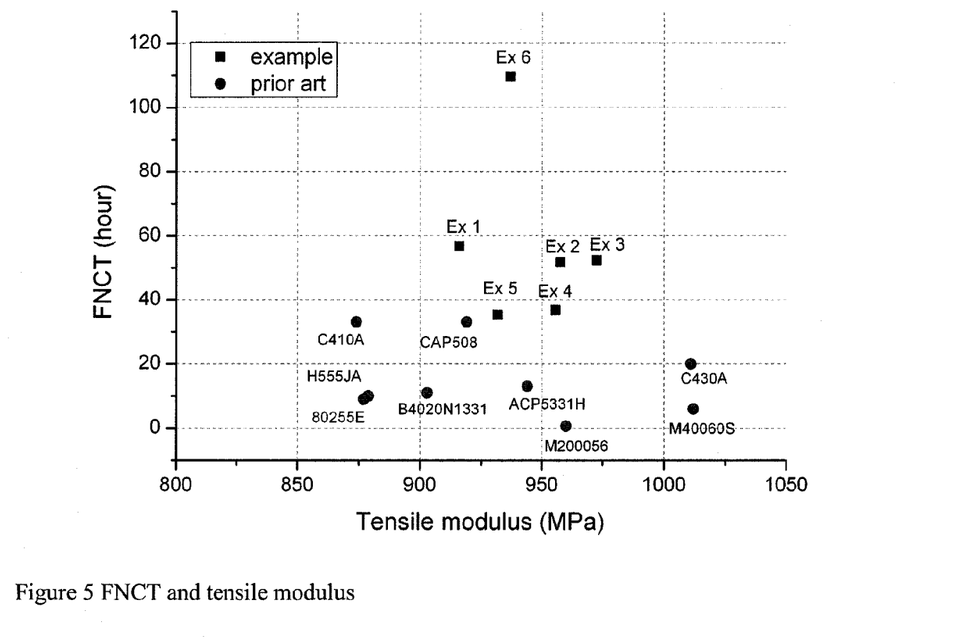
FIG. 5 shows FNCT vs tensile modulus of the polymers of the invention and those of the prior art.

Moreover, when the injection moulding process is complete, a further problem which can occur is the formation of angel hair. Angel hair is fibre like strands of polymer that form on the top of the cap at the injection point as the cap is moved away from the injection moulding nozzle in the continuous injection moulding process. If the injection moulding process and the polymer used is not ideally suited to the injection moulding process, the polymer melt can stretch to form these fibre like hairs. The polymers of the invention also minimise formation of such hair. FIG. 3 shows the formation of angel hair on a cap. Angel hairs can have serious consequences for further manipulation of the cap, e.g. printing thereon and upon its appearance.

The invention relies on the use of polymers which have particular molecular weight distribution through a comparison on their Mz, Mn and Mw values. The present inventors have found that a particular relationship of Mz, Mw and Mn gives rise to polymers with advantageous properties. In particular therefore, the ratio of Mz/Mw must be low compared to the ratio of Mw/Mn. The relationship in claim 1 defines polymers that have a less pronounced high molecular weight tail. This does not prevent the polymers possessing a relatively broad molecular weight distribution Mw/Mn however.

Without wishing to be limited by theory, it may be that the problem of angel hair is exacerabated by the presence of high molecular weight chains within the polymer. It may be that because the polymers of the invention have a less pronounced high molecular weight tail that the polymers offer benefits in terms of minimising angel hair. Also, the inventors suggest that high levels of Mz/Mw may result in the formation of larger "high tips" on caps Our polymers may therefore enable the formation of lower "high tip".

For avoidance of doubt, these high tips are so small that cutting them off is impractical. Also, caps are produced rapidly in high numbers and the cost of even attempting a cutting process on a plurality of caps would be prohibitive.

The advantageous properties of the HDPE of the invention can also be achieved without loss of processability. Again, the relationship between the high Mw and low Mw chains within the polymer of the invention means that the processability of the polymers of the invention is excellent.

In EP-A-1940942, HDPE compositions are described primarily for blow moulding applications. The compositions comprise a blend of unimodal HDPE and a high Mw unimodal polymer to thus form a bimodal composition. The polymers do not satisfy the ratio in claim 1 however.

The present inventors have compared the polymer of the invention to a broad range of commercial injection moulding grades of comparable tensile modulus to show that the relationship in claim 1 is not one which can be found in commercial polymers and is one which yields the advantageous properties highlighted above.

SUMMARY OF INVENTION

Viewed from one aspect the invention provides a multimodal polyethylene polymer having an MFR$_2$ of 0.05 to 10.0 g/10 min, a density of 940 kg/m$^3$ or more, a tensile modulus of 900 MPa or more and wherein $$M_z/M_w \leq 0.29(M_w/M_n)+0.8.$$

Preferably, the multimodal polyethylene polymer comprises a lower molecular weight homopolymer component and a higher molecular weight copolymer component, e.g. with a C3-12 alpha olefin comonomer.

Thus, viewed from another aspect the invention provides a multimodal polyethylene polymer having a lower molecular weight homopolymer component and a higher molecular weight copolymer component, e.g. with a C3-12 alpha olefin comonomer and having an MFR$_2$ of 0.05 to 10.0 g/10 min, a density of 940 kg/m$^3$ or more, a tensile modulus of 900 MPa or more and wherein $$M_z/M_w \leq 0.29(M_w/M_n)+0.8.$$

The polymer of the invention has a large Mw/Mn ratio and small Mz/Mw ratio. This molecular distribution structure results in injection moulded articles, and in particular caps and closures, which have a good aspect (e.g. lower high-tip and less angel-hair).

Viewed from another aspect the invention provides a multimodal polyethylene polymer having an MFR$_2$ of 0.05 to 10.0 g/10 min, a density of 940 kg/m$^3$ or more, a tensile modulus of 900 MPa or more, wherein $$\frac{M_w^2}{M_n M_z} \geq 2.8 \text{ and wherein}$$

$$\frac{M_z}{M_w} \leq 0.29\left(\frac{M_w}{M_n}\right) + 0.8.$$

Preferably, said multimodal polyethylene polymer comprises a lower molecular weight homopolymer component and a higher molecular weight copolymer component, e.g. with a C3-12 alpha olefin comonomer.

Thus, viewed from another aspect the invention provides a multimodal polyethylene polymer having a lower molecular weight homopolymer component and a higher molecular weight copolymer component, e.g. with a C3-12 alpha olefin comonomer and having an MFR$_2$ of 0.05 to 10.0 g/10 min, a density of 940 kg/m$^3$ or more, a tensile modulus of 900 MPa or more, wherein $$\frac{M_w^2}{M_n M_z} \geq 2.8 \text{ and wherein}$$

$$\frac{M_z}{M_w} \leq 0.29\left(\frac{M_w}{M_n}\right) + 0.8.$$

Viewed from another aspect the invention provides an injection or compression moulded article, such as a cap or closure comprising a polymer as herein before defined. Such caps or closures may weight from 1 to 10 g. Moreover, caps or closures of the invention may possess a high tip of less than 0.5 mm in height, such as less than 0.25 mm in height.

Viewed from another aspect the invention provides the use of the polymer as hereinbefore defined in the manufacture of a injection moulded or compression article, such as a cap or closure.

Viewed from another aspect the invention provides a process for the preparation of a polyethylene as hereinbefore defined comprising;

polymerising ethylene and optionally at least one C3-10 alpha olefin comonomer so as to form a lower molecular weight component (A); and subsequently polymerising ethylene and optionally at least one C3-10 alpha olefin comonomer in the presence of component (A) so as to form a higher molecular weight component (B). The invention further comprises compression or injection moulding the product of said process to form an article. Preferably, the multimodal polyethylene polymer made in this process comprises a lower molecular weight homopolymer component and a higher molecular weight copolymer component, e.g. with a C3-12 alpha olefin comonomer.

DEFINITIONS

The term Mz refers to the Z average molecular weight of the polymer. The Mz is measured by establish thermodynamic equilibrium where molecules distribute according to molecular size. Mz is more sensitive than the other averages to the largest molecules present in the sample and hence the values we report in the present invention represent polymers with a less pronounced high molecular weight tail.

DETAILED DESCRIPTION OF INVENTION

It has been found that the high density polyethylene polymer according to the invention provides an improved material for compression or especially injection moulding, in particular for cap and closure applications, which combines very good mechanical properties e.g. in terms of FNCT and tensile modulus with excellent processability and aspect, e.g. in terms of high tip and angel hair. Whilst problems of angel hair and high tips are not so critical when a cap is compression moulded, the improvements which we observe in terms of FNCT and tensile modulus are important in compression moulded caps.

The polymer of the invention is a multimodal high density ethylene polymer and may be an ethylene homopolymer or an ethylene copolymer. By ethylene copolymer is meant a polymer the majority by weight of which derives from ethylene monomer units. The comonomer contribution preferably is up to 10% by mol, more preferably up to 5% by mol. Ideally however there are very low levels of comonomer present in the polymers of the present invention such as 0.1 to 2 mol %, e.g. 0.1 to 1 mol %.

The other copolymerisable monomer or monomers are preferably C3-20, especially C3-10, alpha olefin comonomers, particularly singly or multiply ethylenically unsaturated comonomers, in particular C3-10-alpha olefins such as propene, but-1-ene, hex-1-ene, oct-1-ene, and 4-methyl-pent-1-ene. The use of hexene and butene is particularly preferred. Ideally there is only one comonomer present.

It is preferred if the polymer of the invention is a copolymer and therefore comprises ethylene and at least one comonomer. Ideally that comonomer is 1-butene.

The polymer of the invention is multimodal and therefore comprises at least two components. The polymer of the invention preferably comprises (A) a lower molecular weight first ethylene homo- or copolymer component, and (B) a higher molecular weight second ethylene homo- or copolymer component.

It is generally preferred if the higher molecular weight component has an Mw of at least 5000 more than the lower molecular weight component, such as at least 10,000 more.

The HDPE of the invention is multimodal. Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The polymer of the invention preferably has an $MFR_2$ of 5 g/10 min or less, preferably 4.5 g/10 min or less, such as 3.5 g/10 min or less, more preferably 2.8 g/10 min or less, especially 2 g/10 min or less, most especially 1.5 g/10 min or less, such as 1.1 g/10 min or less, more especially 1.0 g/10 min or less. The polymer preferably has a minimum $MFR_2$ of 0.1 g/10 min, such as 0.3 g/10 min.

The polymer of the invention preferably has an $MFR_{21}$ of 20 to 100 g/10 min, such as 25 to 90 g/10 min, more preferably 30 to 80 g/10 min, most preferably 30 to 60 g/10 min.

The polymer of the invention preferably has an $MFR_5$ of 0.5 to 20 g/10 min, such as 0.8 to 15 g/10 min, preferably 1 to 10 g/10 min.

The density of the polymer preferably is 940 kg/m³ or more. The polymers of the invention are therefore high density polyethylenes, HDPE. More preferably, the polymer has a density of 945 kg/m³ or more, still more preferably is 950 kg/m³ or more, still more preferably is 952 kg/m³ or more, and most preferably is 954 kg/m³ or more.

Furthermore, the density of the polymer preferably is 970 kg/m³ or lower, and more preferably is 965 kg/m³ or lower. An ideal density range is 950 to 960 kg/m³.

Preferably, the polymer of the invention has a tensile modulus of at least 900 kPa, more preferably at least 910 kPa.

The polymer preferably has an environmental stress crack resistance measured as FNCT of 30 h or more, more preferably 40 h or more, more preferably of 50 h or more.

In particular, the polymers of the invention possess both a tensile modulus of at least 900 MPa and a FNCT of 50 h or more.

It will be appreciated that the molecular weight and molecular distribution of the polymers of the invention is important. The polyethylene polymer preferably has a molecular weight distribution Mw/Mn, being the ratio of the weight average molecular weight Mw and the number average molecular weight Mn, of 10 or more, more preferably of 12 or more, still more preferably of 14 or more.

The polymer preferably has an Mw/Mn of 30 or below, more preferably of 25 or below.

The weight average molecular weight Mw of the polymer preferably is at least 50 kD, more preferably at least 80 kD, and most preferably at least 100 kD. Furthermore, the Mw of the composition preferably is at most 300 kD, more preferably 275 kD.

The Mz/Mw ratio is preferably no more than 8.0, more preferably no more than 7.0, especially no more than 6.5. The Mz/Mw ratio is preferably at least 3.0, more preferably at least 3.5. The actual value of Mz is preferably in the range of 400 kD to 700 kD, such as 450 kD to 600 kD.

The value of $Mw^2/MnMz$ is preferably at least 2.8, such as at least 2.9, especially at least 3.0. This value preferably does not exceed 5.0.

The value of 0.29 (Mw/Mn)+0.8 is preferably between 4.25 and 6.25 meaning the Mz/Mw value should be less than that.

It is particularly, preferred if Mz/Mw is at least 0.25 less, more preferably 0.5 less, especially 0.75 less, most preferably 1.0 less than the value of 0.29 Mw/Mn+0.8.

In another embodiment the value of the equation is preferably $$(1.05\ Mz)/Mw \leq (0.29\ Mw/Mn)+0.8$$

$$(1.1\ Mz)/Mw \leq (0.29\ Mw/Mn)+0.8$$

$$(1.15\ Mz)/Mw \leq (0.29\ Mw/Mn)+0.8;\ \text{or even}$$

$$(1.2\ Mz)/Mw \leq (0.29\ Mw/Mn)+0.8$$

These equations emphasize therefore that the difference between the Mz/Mw value and (0.29 Mw/Mn)+0.8 is significant.

These molecular weight relationships in claim 1 define a high density polyethylene with a larger concentration of higher content of low molecular chains and a lower content of higher molecular weight chains. Whilst this affects the Mz value, the Mw/Mn value is independent. This weighting of the molecular weight distribution occurs results in the advantageous properties which we observe in the present application.

As noted above, the polymers of the invention preferably comprise a lower molecular weight component (A) and a higher molecular weight component (B). The weight ratio of fraction (A) to fraction (B) in the composition is in the range 30:70 to 70:30, more preferably 35:65 to 65:35, most preferably 40:60 to 60:40. In some embodiments the ratio may be 45 to 55 wt % of fraction (A) and 55 to 45 wt % fraction (B), such as 45 to 52 wt % of fraction (A) and 55 to 48 wt % fraction (B). It has been found however that the best results are obtained when the HMW component is present at the same precentage or even predominates, e.g. 50 to 54 wt % of the HMW component (B) and 50 to 46 wt % fraction (A).

Fractions (A) and (B) may both be ethylene copolymers or ethylene homopolymers, although preferably at least one of the fractions is an ethylene copolymer. Preferably, the polymer comprises an ethylene homopolymer and an ethylene copolymer component.

Where one of the components is an ethylene homopolymer, this is preferably the component with the lower weight average molecular weight (Mw), i.e. fraction (A). An ideal polymer is therefore a lower molecular weight homopolymer component (A) with a higher molecular weight component (B), ideally an ethylene butene higher molecular weight component.

The lower molecular weight fraction (A) preferably has an $MFR_2$ of 10 g/10 min or higher, more preferably of 50 g/10 min or higher, and most preferably 100 g/10 min or higher.

Furthermore, fraction (A) preferably, has an $MFR_2$ of 1000 g/10 min or lower, preferably 800 g/10 min or lower, and most preferably 600 g/10 min or lower.

The weight average molecular weight Mw of fraction (A) preferably is 10 kD or higher, more preferably is 20 kD or higher. The Mw of fraction (A) preferably is 90 kD or lower, more preferably 80 kD or lower, and most preferably is 70 kD or lower.

Preferably, fraction (A) is an ethylene homo- or copolymer with a density of at least 965 kg/m³.

Most preferably, fraction (A) is an ethylene homopolymer. If fraction (A) is a copolymer, the comonomer is preferably 1-butene. The comonomer content of fraction (A), if it is a copolymer, is preferably very low, such as less than 0.2 mol %, preferably less than 0.1 mol %, especially less than 0.05 mol %. A further preferred option therefore, is for fraction (A) to be a homopolymer or a copolymer with a very low comonomer content, such as less than 0.2 mol %, preferably less than 0.1 mol %, especially less than 0.05 mol %. The higher Mw fraction (B) is then preferably a copolymer.

The higher molecular weight fraction (B) preferably has an Mw of 60 kD or higher, more preferably of 100 kD or higher. Furthermore, fraction (B) preferably has an Mw of 500 kD or lower, more preferably of 400 kD or lower.

Preferably, fraction (B) is an ethylene homo- or copolymer with a density of less than 965 kg/m³.

Most preferably, fraction (B) is a copolymer. Preferred ethylene copolymers employ alpha-olefins (e.g. C3-12 alpha-olefins) as comonomers. Examples of suitable alpha-olefins include but-1-ene, hex-1-ene and oct-1-ene. But-1-ene is an especially preferred comonomer.

Where herein features of fractions (A) and/or (B) of the composition of the present invention are given, these values are generally valid for the cases in which they can be directly measured on the respective fraction, e.g. when the fraction is separately produced or produced in the first stage of a multistage process. However, the composition may also be and preferably is produced in a multistage process wherein e.g. fractions (A) and (B) are produced in subsequent stages. In such a case, the properties of the fractions produced in the second step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

A multimodal (e.g. bimodal) polyethylene as hereinbefore described may be produced by mechanical blending two or more polyethylenes (e.g. monomodal polyethylenes) having differently centred maxima in their molecular weight distributions. The monomodal polyethylenes required for blending may be available commercially or may be prepared using any conventional procedure known to the skilled man in the art. Each of the polyethylenes used in a blend and/or the final polymer composition may have the properties hereinbefore described for the lower molecular weight component, higher molecular weight component and the composition, respectively.

The process of the invention preferably involves
polymerising ethylene and optionally at least one C3-10 alpha olefin comonomer so as to form a lower molecular weight component (A); and subsequently
polymerising ethylene and optionally at least one C3-10 alpha olefin comonomer in the presence of component (A) so as to form a higher molecular weight component (B).

It is preferred if at least one component is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Preferably, the multimodal polyethylene composition may be produced by polymerisation using conditions which create a multimodal (e.g. bimodal) polymer product, e.g. using a catalyst system or mixture with two or more different catalytic sites, each site obtained from its own catalytic site precursor, or using a two or more stage, i.e. multistage, polymerisation process with different process conditions in the different stages or zones (e.g. different temperatures, pressures, polymerisation media, hydrogen partial pressures, etc).

Preferably, the multimodal (e.g. bimodal) composition is produced by a multistage ethylene polymerisation, e.g. using a series of reactors, with optional comonomer addition preferably in only the reactor(s) used for production of the higher/highest molecular weight component(s) or differing comonomers used in each stage. A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Polymer compositions produced in a multistage process are also designated as "in-situ" blends.

Accordingly, it is preferred that fractions (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process for producing the composition according to the invention are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 20% by weight, preferably 1 to 10% by weight, more preferably 1 to 5% by weight, of the total composition is produced. The prepolymer is preferably an ethylene homopolymer (High Density PE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is silica supported ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis, EP 0 688 794 and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the two or more reactors, the different molecular-weight-distribution curves of these polymers together forming a molecular-weight-distribution curve having a broad maximum or two or more maxima, i.e. the end product is a bimodal or multimodal polymer mixture.

It is preferred that the base resin, i.e. the entirety of all polymeric constituents, of the composition according to the invention is a bimodal polyethylene mixture consisting of fractions (A) and (B), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 100 to 800 moles of H2/kmoles of ethylene are added to the reactor, when the LMW fraction is produced in this reactor, and 50 to 500 moles of H2/kmoles of ethylene are added to the gas phase reactor when this reactor is producing the HMW fraction.

In the production of the composition of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

The polyethylene composition may also contain minor quantities of additives such as pigments, nucleating agents, antistatic agents, fillers, antioxidants, etc., generally in amounts of up to 10% by weight, preferably up to 5% by weight.

Optionally, additives or other polymer components can be added to the composition during the compounding step in the amount as described above. Preferably, the composition of the invention obtained from the reactor is compounded in the extruder together with additives in a manner known in the art.

The polyethylene polymer of the invention may also be combined with other polymer components such as other polymers of the invention, with other HDPEs or with other polymers such as LLDPE or LDPE. However articles of the invention such as caps and closures are preferably at least 90 wt % of the polymer of the invention, such as at least 95 wt %. In one embodiment, the articles consist essentially of the polymer of the invention. The term consists essentially of means that the polymer of the invention is the only "non additive" polyolefin present. It will be appreciated however that such a polymer may contain standard polymer additives some of which might be supported on a polyolefin (a so called masterbatch as is well known in the art). The term consists essentially of does not exclude the presence of such a supported additive.

Applications

Still further, the present invention relates to an injection or compression moulded article, preferably a cap or closure, comprising a polyethylene composition as described above and to the use of such a polyethylene composition for the production of an injection or compression moulded article, preferably a cap or closure. Preferably, injection moulded articles are made.

Injection moulding of the composition hereinbefore described may be carried out using any conventional injection moulding equipment. A typical injection moulding process may be carried out a temperature of 190 to 275° C.

Still further, the present invention relates to a compression moulded article, preferably a caps or closure article, comprising a polyethylene polymer as described above and to the use of such a polyethylene polymer for the production of a compression moulded article, preferably a cap or closure.

Preferably, the composition of the invention is used for the production of a caps or closure article.

As noted above, the caps and closures of the present invention are advantageous not only because of their high FNCT and tensile modulus properties, but also because they minimise the formation of angel hair and high tips. It is thus preferred if any injection moulding process does not result in the formation of angel hair.

It is also preferred if caps comprising the polymer of invention have a high tip of less than 0.5 mm in height, such as 250 microns or less, in height, e.g. 200 microns or less such as 100 microns or less. Ideally, the high tip is so small that the human being cannot feel it on top of the cap or closure.

The caps and closures of the invention are of conventional size, designed therefore for bottles and the like. They are approximately 2 to 8 cm in outer diameter (measured across the solid top of the cap) depending on the bottle and provided with a screw. Cap height might be 0.8 to 3 cm.

Caps and closure may be provided with tear strips from which the cap detaches on first opening as is well known in the art. Caps may also be provided with liners.

It will be appreciated that any parameter mentioned above is measured according to the detailed test given below. In any parameter where a narrower and broader embodiment are disclosed, those embodiments are disclosed in connection with the narrower and broader embodiments of other parameters.

The invention will now be described with reference to the following non limiting examples and figures.

TEST METHODS

Melt Flow Rate

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend, $w_i$ is the weight fraction of component "i" in the blend and $\rho_i$ is the density of the component "i".

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. Standard single-pulse excitation was employed utilising the transient NOE at short recycle delays of 3 s {pollard04, klimke06} and the RS-HEPT decoupling scheme {fillip05, griffin07}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-butene were observed (randall89) and all contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.84 ppm assigned to the *B2 sites, accounting for the number of reporting sites per comonomer:

$$B-I_{*B2}$$

With no other signals indicative of other comonomer sequences, i.e. consecutive comonomer incorporation, observed the total 1-butene comonomer content was calculated based solely on the amount of isolated 1-butene sequences:

$$B_{total}=B$$

The relative content of ethylene was quantified using the integral of the bulk methylene (δ+) signals at 30.00 ppm:

$$E=(1/2)*I_{\delta+}$$

The total ethylene comonomer content was calculated based the bulk methylene signals and accounting for ethylene units present in other observed comonomer sequences or end-groups:

$$E_{total}=E+(5/2)*B$$

The total mole fraction of 1-butene in the polymer was then calculated as:

$$fB=(B_{total}/(E_{total}+B_{total})$$

The total comonomer incorporation of 1-butene in mole percent was calculated from the mole fraction in the usual manner:

$$B[\text{mol \%}]=100*fB$$

The total comonomer incorporation of 1-butene in weight percent was calculated from the mole fraction in the standard manner:

$$B[\text{wt \%}]=100*(fB*56.11)/((fB*56.11)+(fH*84.16)+((1-(fB+fH))*28.05))$$

klimke06

Klimke, K., Parkinson, M., Piel, C., Kaminsky, W., Spiess, H. W., Wilhelm, M., Macromol. Chem. Phys. 2006; 207:382.

pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
randall89
J. Randall, Macromol. Sci., Rev. Macromol. Chem. Phys. 1989, C29, 201.

Molecular Weight

Molecular weight averages, molecular weight distribution (Mn, Mw, Mz MWD) Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} \left(\frac{A_i}{M_i}\right)} \quad (1)$$

$$M_w = \frac{\sum_{i=1}^{N} ([A]_i \times M_i)}{\sum_{i=1}^{N} A_i} \quad (2)$$

$$M_z = \frac{\sum_{i=1}^{N} ([A]_i \times M_i^2)}{\sum_{i=1}^{N} \left(\frac{A_i}{M_i}\right)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Spiral Flow

Spiral Test is carried out using an Engel ES330/65 cc90 injection molding apparatus with a spiral mould and pressure of 1000 bar;
screw diameter: 35 mm
max. piston displacement: 150 cm³
tool form: oval form; provided by Axxicon; thickness 2 mm, breadth: 5 mm
temperature in pre-chamber and die: 220° C.
temperature in zone 2/zone 3/zone 4/zone 5: 220° C./230° C./225° C./200° C.
injection cycle: injection time including holding: 15 s
cooling time: 15 s
injection pressure: Follows from the predetermined length of the testing material.
dwell pressure=injection pressure
screw speed: 30 rpm
system pressure: 160 bar
metering path: Metering stroke should be set so the screw stops 20 mm before final position by end of the holding pressure.
tool temperature: 40° C.
The spiral flow length can be determined immediately after the injection operation.

Tensile Properties

Tensile properties were measured on injection moulded samples according to ISO 527-2, Specimen type Multipurpose bar 1A, 4 mm thick. Tensile modulus was measured at a speed of 1 mm/min. Sample preparation was done acc ISO 1872-2

Environmental Stress Crack Resistance

Environmental Stress Crack Resistance (ESCR) may be measured according to the full notch creep test method (FNCT) according to ISO/DIS 16770 at 50° C. with a notch depth of 1 mm and specimen dimensions 6 mm×6 mm×90 mm. The solvent used was 2 wt % Arcopal N110 in deionized water. Compression moulded samples were employed (ISO 1872-2), cooling rate at compression moulding: 15 K/min. Time to failure ($t_f$) was measured at 4 different stress levels (σ) between 5-7 MPa. A plot of log($t_f$) vs. log(σ) was fitted with a straight line and a equation of the form log($t_f$)=A log(σ)+B. FNCT value at 6 MPa stress is then calculated based on linear interpolation using the equation.

Environmental Stress Crack Resistance

Environmental stress crack resistance (ESCR) was determined according to ASTM 1693, condition B at 50° C. and using 10% Igepal co-630.

Experimental

Synthesis of the Polymers of the Invention:
Catalyst Preparation
Complex Preparation:

87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having average particle size of 20 mm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg $TiCl_4$ was added during 0.5 hours at 45° C. The slurry was stirred at 40° C. for five hours. The catalyst was then dried by purging with nitrogen.

The polymers of the invention were prepared as outlined in table 1 in a Borstar process using the catalyst above and TEAL cocatalyst:

TABLE 1

|  | Ex 1 | Ex 2 | Ex 3 | Ex 4 | Ex 5 | Ex 6 |
| --- | --- | --- | --- | --- | --- | --- |
| Prepolymerisation |  |  |  |  |  |  |
| Temperature ° C. | 70 | 70 | 70 | 70 | 70 | 70 |
| Pressure (kPa) | 6120 | 6115 | 6123 | 6120 | 6122 | 6130 |
| Ethylene feed (kg/h) | 2 | 2 | 2 | 2 | 2 | 2 |
| Hydrogen feed (g/h) | 5 | 5 | 5 | 5 | 5 | 5 |
| Propane feed (kg/h) | 47.1 | 47.1 | 47.1 | 47.3 | 47.2 | 47.3 |
| Catalyst feed (g/h) | 14.7 | 15.1 | 15 | 14.2 | 14.5 | 14.6 |
| Cocatalyst feed (g/h) | 4.3 | 4.3 | 4.3 | 4.3 | 4.1 | 4.1 |
| Antistatic agent conc (ppm) | 5 | 5 | 5 | 5 | 5 | 5 |
| Production rate (kg/h) | 1.9 | 1.9 | 1.9 | 1.9 | 1.9 | 1.8 |
| Reactor 1 - Loop |  |  |  |  |  |  |
| Temperature (° C.) | 95 | 95 | 95 | 95 | 95 | 95 |
| Pressure (kPa) | 5778.3 | 5780.6 | 5779.4 | 5778.4 | 5779.4 | 5778.1 |
| Ethylene concentration (mol-%) | 5.7 | 6.3 | 6.3 | 5.8 | 5.7 | 5.7 |
| Cocatalyst feed (g/h) | 4.3 | 4.3 | 4.3 | 4.3 | 4.1 | 4.1 |
| H2/C2 ratio (mol/kmol) | 479.5 | 464.5 | 447.4 | 489.6 | 483.2 | 476 |
| C4/C2 ratio (mol/kmol) | 0 | 0 | 0 | 0 | 0.5 | 0.3 |
| Al/Ti ratio (mol/mol) | 10.7 | 10.4 | 10.5 | 11 | 10.3 | 9.7 |
| Production rate (kg/h) | 38.4 | 37.9 | 37.9 | 38.2 | 37.6 | 37.5 |
| split % | 47.4 | 48.5 | 48.7 | 43.3 | 38.3 | 43 |
| Reactor 2 - Gas Phase |  |  |  |  |  |  |
| Temperature (° C.) | 85 | 85 | 85 | 85 | 85 | 85 |
| Pressure (kPa) | 2000 | 1999.5 | 2000 | 2000.1 | 2000 | 1999.9 |
| Ethylene concentration (mol-%) | 8.2 | 8.1 | 8.6 | 10.6 | 15.5 | 11.2 |
| H2/C2 ratio (mol/kmol) | 70.4 | 60.7 | 62.4 | 88 | 103 | 52.1 |
| C4/C2 ratio (mol/kmol) | 100.4 | 65.7 | 53.3 | 50.9 | 44.5 | 54.7 |
| Production rate (kg/h) | 40.8 | 38.5 | 38.5 | 48.2 | 58.5 | 48.6 |
| Split % | 50.4 | 49.2 | 49.1 | 54.7 | 59.9 | 54.9 |
| Final MFR$_2$ (g/10 min) | 1.35 | 0.86 | 0.8 | 0.88 | 0.89 | 0.35 |
| Final density (kg/m$^3$) | 954.2 | 956.1 | 956.8 | 956.4 | 955.6 | 954.5 |
| Final Mw (g/mol) | 114000 | 118000 | 119000 | 117000 | 117000 | 135000 |

Results are presented in tables 2 to 8.

TABLE 2

|  | Density kg/m$^3$ | MFR 2, 16 g/10 min | MFR 5 g/10 min | MFR 21 g/10 min |
| --- | --- | --- | --- | --- |
| Ex 1 | 954.2 | 1.35 | 4.94 |  |
| Ex 2 | 956.1 | 0.86 | 3.35 |  |
| Ex 3 | 956.8 | 0.8 | 3.06 | 56.8 |
| Ex 4 | 956.4 | 0.88 | 3.15 | 52.02 |
| Ex 5 | 955.6 | 0.89 | 3.03 | 43.46 |
| Ex 6 | 954.5 | 0.35 | 1.27 |  |

TABLE 3

|  | Tensile modulus MPa | Spiral flow at 220 C., 1000 bar mm | Spiral flow at 190 C., 1000 bar mm | comonomer content [mol %] |
| --- | --- | --- | --- | --- |
| Ex 1 | 916 | 439 | 389 | 0.55 |
| Ex 2 | 957.6 | 411 | 364 | 0.37 |
| Ex 3 | 972.6 | 412 | 360 | 0.33 |
| Ex 4 | 955.6 | 386 | 333 | 0.31 |
| Ex 5 | 931.8 | 352 | 303 | 0.22 |
| Ex 6 | 937 | 320 | 270 | 0.26 |

TABLE 4

| Sample | Mn | Mw | Mz | Mv | Mw/Mn | Mz/Mw |
| --- | --- | --- | --- | --- | --- | --- |
| Ex 1 | 7000 | 114000 | 624000 | 84000 | 16.3 | 5.5 |
| Ex 2 | 7000 | 118000 | 553000 | 88000 | 16.9 | 4.7 |
| Ex 3 | 8000 | 119000 | 535000 | 89000 | 14.9 | 4.5 |
| Ex 4 | 8000 | 117000 | 528000 | 89000 | 14.6 | 4.5 |
| Ex 5 | 9000 | 117000 | 499000 | 91000 | 13.0 | 4.3 |
| Ex 6 | 8000 | 135000 | 548000 | 104000 | 16.9 | 4.1 |

TABLE 5

| Sample | 0.29(Mw/Mn) + 0.8 | Mz/Mw | $(Mw)^2$/(Mn Mz) | Tensile modulus MPa | FNCT (6.0 MPa/50° C.) hours |
|---|---|---|---|---|---|
| Ex 1 | 5.52 | 5.5 | 3.0 | 916 | 56.8 |
| Ex 2 | 5.69 | 4.7 | 3.6 | 957.6 | 51.9 |
| Ex 3 | 5.11 | 4.5 | 3.3 | 972.6 | 52.3 |
| Ex 4 | 5.04 | 4.5 | 3.2 | 955.6 | 36.8 |
| Ex 5 | 4.57 | 4.3 | 3.0 | 931.8 | 35.4 |
| Ex 6 | 5.69 | 4.1 | 4.2 | 937 | 109.6 |

Injection Moulding of the Screw Caps:

Injection moulding of the screw caps (type: PE PCO1881 short neck) was done on an Engel speed 180, melt temperature ~225° C., injection speed: relativ 180 mm/s, absolut 173 cm³/s; injection time 0.35 s, back pressure 1 bar. The mould was equipped with a hot runner system, mould-temperature: 10° C.

Cap properties are reported in table 6.

TABLE 6

| Sample | Cap Size mm | ESCR |
|---|---|---|
| Ex 1 | 29.89 | Good |
| Ex 2 | 29.82 | Good |
| Ex 3 | 29.8 | Good |
| Ex 4 | 29.76 | Good |
| Ex 5 | 29.8 | Good |
| Ex 6 | 29.7 | Good |

The polymers of the invention have been compared to a wide range of commercially available caps/closures grades sold by various manufacturers.

TABLE 7

| | Grade | Mn | Mw | Mz | Mw/Mn | Mz/Mw | Density |
|---|---|---|---|---|---|---|---|
| SCG | H555JA | 17900 | 99660 | 461090 | 5.57 | 4.63 | 951 |
| Sabic | M40060S | 17476 | 72167 | 220676 | 4.13 | 3.06 | 959.1 |
| | M200056 | 12527 | 47900 | 156290 | 3.82 | 3.26 | 956.4 |
| Samsung | C430A | 9475 | 101860 | 585390 | 10.75 | 5.75 | 957.3 |
| | C410A | 7583 | 114448 | 669051 | 15.09 | 5.85 | 953.2 |
| Basell | ACP 5331 H | 15472 | 91161 | 351027 | 5.89 | 3.85 | 955.4 |
| INEOS | B4020N 1331 | 15000 | 94930 | 439334 | 6.33 | 4.63 | 953.1 |
| | Superstress CAP508 | 8359 | 88765 | 416278 | 10.62 | 4.69 | 953.9 |
| Dow | 80255E | 13502 | 93716 | 471630 | 6.94 | 5.03 | 952.3 |

TABLE 8

| Grade | 0.29(Mw/Mn) + 0.8 | Mz/Mw | $(Mw)^2$/(Mn Mz) | MFR2 g/10 min | Tensile modulus MPa | FNCT (6.0 MPa/50° C.) hours |
|---|---|---|---|---|---|---|
| H555JA | 2.41 | 4.63 | 1.2 | 1.67 | 879 | 10 |
| M40060S | 2.00 | 3.06 | 1.4 | 4.58 | 1012 | 6 |
| M200056 | 1.91 | 3.26 | 1.2 | 21 | 960 | 0.6 |
| C430A | 3.92 | 5.75 | 1.9 | 1.75 | 1011 | 20 |
| C410A | 5.18 | 5.85 | 2.6 | 1.08 | 874 | 33.1 |
| ACP 5331 H | 2.51 | 3.85 | 1.5 | 2.07 | 944 | 13 |
| B4020N 1331 | 2.64 | 4.63 | 1.4 | 2.14 | 903 | 11 |

TABLE 8-continued

| Grade | 0.29(Mw/Mn) + 0.8 | Mz/Mw | $(Mw)^2$/(Mn Mz) | MFR2 g/10 min | Tensile modulus MPa | FNCT (6.0 MPa/50° C.) hours |
|---|---|---|---|---|---|---|
| Superstress CAP508 | 3.88 | 4.69 | 2.3 | 1.69 | 919 | 33.1 |
| 80255E | 2.81 | 5.03 | 1.4 | 2.16 | 877 | 9 |

It can be seen that all grades tested fail to satisfy the equation forming pat of claim 1. The polymers of the invention therefore possess a higher FNCT without loss of tensile modulus.

The invention claimed is:

1. A multimodal polyethylene polymer having an $MFR_2$ of 0.1 to 2 g/10 min, a density of 940 kg/m³ or more, a tensile modulus of 900 MPa or more and wherein $$M_z/M_w \leq 0.29(M_w/M_n) + 0.8.$$

2. A multimodal polyethylene polymer as claimed in claim 1 wherein $$\frac{M_w^2}{M_n M_z} \geq 2.8.$$

3. A multimodal polyethylene polymer as claimed in claim 1 having a density of 950 to 960 kg/m³.

4. A multimodal polyethylene polymer as claimed in claim 1 having tensile modulus 910 MPa or more.

5. A multimodal polyethylene polymer as claimed in claim 1 wherein Mz is in the range of 400 kD to 700 kD.

6. A multimodal polyethylene polymer as claimed in claim 1 having FNCT more than 50 h.

7. A multimodal polyethylene polymer as claimed in claim 1 having 0.1 to 1 mol % comonomer.

8. A multimodal polyethylene polymer as claimed in claim 1 wherein said polymer is a copolymer with the comonomer 1-butene.

9. A multimodal polyethylene polymer as claimed in claim 1 having a lower molecular weight component and a higher molecular weight copolymer component wherein said lower molecular weight component is a homopolymer or a copolymer with a comonomer content of less than 0.2 mol %.

10. A multimodal polyethylene polymer as claimed in claim 1 having a lower molecular weight component and a higher molecular weight copolymer component wherein said lower molecular weight component is a homopolymer or a copolymer with a comonomer content of less than 0.1 mol %.

11. A multimodal polyethylene polymer as claimed in claim 1 having a lower molecular weight component and a higher molecular weight copolymer component wherein said lower molecular weight component is a homopolymer or a copolymer with a comonomer content of less than 0.05 mol %.

12. A multimodal polyethylene polymer as claimed in claim 1 having a lower molecular weight (LMW) homopolymer component and a higher molecular weight (HMW) ethylene copolymer component.

13. A multimodal polyethylene polymer as claimed in claim 1 having a lower molecular weight (LMW) homopolymer component and a higher molecular weight (HMW)

ethylene copolymer component, wherein said HMW copolymer component comprises at least one C3-12 alpha olefin.

14. A multimodal polyethylene polymer as claimed in claim 1 having a lower molecular weight (LMW) homopolymer component and a higher molecular weight (HMW) ethylene copolymer component, wherein said HMW copolymer component comprises but-1-ene, hex-1-ene or oct-1-ene.

15. A multimodal polyethylene polymer as claimed in claim 1 having 48 to 55 wt % of a HMW component (B) and 52 to 45 wt % LMW component (A).

16. An injection or compression moulded article comprising a polymer as claimed in claim 1.

17. An injection or compression moulded article of claim 16, wherein the article is a cap or closure.

18. A process for the preparation of a polyethylene as claimed in claim 1 comprising;
polymerising ethylene and optionally at least one C3-10 alpha olefin comonomer so as to form a lower molecular weight component (A); and subsequently
polymerising ethylene and optionally at least one C3-10 alpha olefin comonomer in the presence of component (A) so as to form a higher molecular weight component (B).

19. A multimodal polyethylene copolymer derived from the comonomer 1-butene, wherein the copolymer has $MFR_2$ of 0.05 to 10.0 g/10 min, a density of 940 kg/m³ or more, a tensile modulus of 900 MPa or more and wherein $$M_z/M_w \leq 0.29(M_w/M_n)+0.8.$$

20. A multimodal polyethylene polymer having $MFR_2$ of 0.05 to 10.0 g/10 min, an Mz in the range of 400 kD to 700 kD, a density of 940 kg/m³ or more, a tensile modulus of 900 MPa or more and wherein $$M_z/M_w \leq 0.29(M_w/M_n)+0.8.$$

21. A multimodal polyethylene polymer as claimed in claim 20 wherein Mz is in the range of 450 kD to 600 kD.

22. An injection or compression moulded article comprising a cap having a high tip of less than 0.5 mm or having no high tip at all, wherein the cap comprises a multimodal polyethylene polymer having an $MFR_2$ of 0.05 to 10.0 g/10 min, a density of 940 kg/m³ or more, a tensile modulus of 900 MPa or more and wherein $$M_z/M_w \leq 0.29(M_w/M_n)+0.8.$$

* * * * *